US009576736B2

(12) United States Patent
Tsubokawa

(10) Patent No.: US 9,576,736 B2
(45) Date of Patent: Feb. 21, 2017

(54) METHOD OF MANUFACTURING ELECTRONIC COMPONENT

(71) Applicant: MURATA MANUFACTURING CO., LTD., Kyoto-fu (JP)

(72) Inventor: Kengo Tsubokawa, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 150 days.

(21) Appl. No.: 14/509,495

(22) Filed: Oct. 8, 2014

(65) Prior Publication Data

US 2015/0113780 A1  Apr. 30, 2015

(30) Foreign Application Priority Data

Oct. 25, 2013 (JP) ................................ 2013-222154
Aug. 21, 2014 (JP) ................................ 2014-168325

(51) Int. Cl.
$H01G\ 4/30$ (2006.01)
$H01G\ 4/005$ (2006.01)
(Continued)

(52) U.S. Cl.
CPC .................. *H01G 4/30* (2013.01); *H01C 1/14* (2013.01); *H01G 4/005* (2013.01); *H01G 4/12* (2013.01);
(Continued)

(58) Field of Classification Search
CPC ........ H01G 4/005; H01G 4/12; H01G 4/1218; H01G 4/1236; H01G 4/30; H01G 13/006; Y10T 29/43; Y10T 29/49078; Y10T 29/49147; Y10T 29/49798; H01C 1/14
See application file for complete search history.

(56) References Cited

U.S. PATENT DOCUMENTS

| 2009/0229860 A1* | 9/2009 | Shin ......................... H01G 4/30 |
| | | 174/250 |
| 2011/0309718 A1* | 12/2011 | Ogawa .................. H01G 4/232 |
| | | 310/311 |
| 2013/0208398 A1 | 8/2013 | Tanaka et al. |

FOREIGN PATENT DOCUMENTS

| CN | 100336142 C | 9/2007 |
| JP | H09-129485 A | 5/1997 |
| | (Continued) | |

OTHER PUBLICATIONS

An Office Action issued by the Korean Patent Office on Nov. 19, 2015, which corresponds to Korean Patent Application No. 10-2014-0139105 and is related to U.S. Appl. No. 14/509,495; with English language translation.
(Continued)

*Primary Examiner* — A. Dexter Tugbang
(74) *Attorney, Agent, or Firm* — Studebaker & Brackett PC

(57) ABSTRACT

A method of manufacturing an electronic component includes the steps of: preparing a first block formed by stacking a plurality of green sheets serving as an element body; cutting the first block in a first direction into a plurality of second blocks such that a portion of an internal conductor connected to an external electrode is exposed at a cut surface; and cutting each of the plurality of second blocks in a second direction crossing the first direction such that the internal conductor exposed at each of both cut surfaces is located in the center of a portion serving as each element body in the first direction in each of the plurality of second blocks.

3 Claims, 16 Drawing Sheets

(51) Int. Cl.
    *H01G 4/12* (2006.01)
    *H01C 1/14* (2006.01)
    *H01G 13/00* (2013.01)

(52) U.S. Cl.
    CPC .......... *H01G 4/1218* (2013.01); *H01G 4/1236* (2013.01); *H01G 13/006* (2013.01); *Y10T 29/43* (2015.01); *Y10T 29/49078* (2015.01); *Y10T 29/49147* (2015.01); *Y10T 29/49798* (2015.01)

(56) References Cited

FOREIGN PATENT DOCUMENTS

| | | | |
|---|---|---|---|
| JP | 2003-039418 A | | 2/2003 |
| JP | 2003158376 A | * | 5/2003 |
| JP | 2005-088161 A | | 4/2005 |
| KR | 2013-0070098 A | | 6/2013 |
| KR | 2013-0093034 A | | 8/2013 |

OTHER PUBLICATIONS

An Office Action; "Notice of Grounds of Rejection," issued by the Japanese Patent Office on Dec. 13, 2016, which corresponds to Japanese Patent Application No. 2014-168325 and is related to U.S. Appl. No. 14/509,495; with English language translation.

* cited by examiner

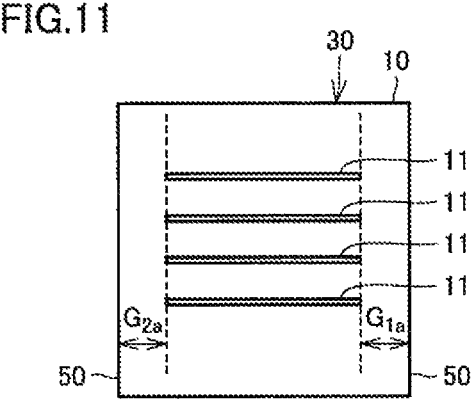
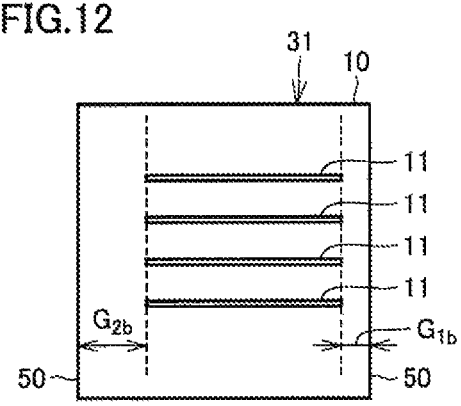

METHOD OF MANUFACTURING ELECTRONIC COMPONENT

CROSS REFERENCE TO RELATED APPLICATIONS

This application claims benefit of priority to Japanese Patent Application No. 2013-222154 filed Oct. 25, 2013, and to Japanese Patent Application No. 2014-168325 filed Aug. 21, 2014, the entire content of each of which is incorporated herein by reference.

TECHNICAL FIELD

The present technical field relates to a method of manufacturing an electronic component, and particularly to a method of manufacturing an electronic component formed of each of a plurality of chips cut out from a mother block.

BACKGROUND

Japanese Patent Laying-Open No. 2005-88161 is found as a prior art document disclosing a cutting method for cutting a mother block to form a plurality of chips. According to the cutting method disclosed in Japanese Patent Laying-Open No. 2005-88161, CCD (charge-coupled device) cameras are disposed so as to face each other such that both end faces of a mother block facing each other can be imaged. The CCD cameras are used to image cut traces formed on the end faces of the mother block, to correct positional misalignment of internal conductors caused by distortion of the mother block, and then, cut the mother block.

Within the mother block in which portions serving as chips are arranged in a matrix form, internal conductors are arranged at regular intervals in a matrix form for the sake of design. In fact, positional misalignment of the internal conductors resulting from distortion of the mother block is caused by influences of the positional accuracy in each of the process of stacking ceramic green sheets and the process of printing an internal conductor during production of the mother block. Furthermore, positional misalignment of the internal conductors resulting from distortion of the mother block is mainly caused by flow of ceramic green sheets in the press process in which the mother block is pressure-bonded.

When the mother block is cut based on the result of imaging both end faces of the mother block, positional misalignment of the internal conductors in the chip cut out from the center portion of the mother block that is at a distance from both end faces may not be suppressed depending on the distortion state of the mother block.

SUMMARY

A main object of the present disclosure is to provide a method of manufacturing an electronic component, by which positional misalignment of internal conductors in each of a plurality of chips cut out from a mother block can be suppressed.

A method of manufacturing an electronic component according to the present disclosure is a method including an element body in which an internal conductor is embedded, and an external electrode disposed on a surface of the element body and electrically connected to the internal conductor. The method of manufacturing an electronic component includes the steps of: preparing a first block formed by stacking a plurality of green sheets serving as the element body; cutting the first block in a first direction into a plurality of second blocks such that a portion of the internal conductor connected to the external electrode is exposed at a cut surface; and cutting each of the plurality of second blocks in a second direction crossing the first direction such that the internal conductor exposed at each of the cut surfaces is located in a center part of a portion serving as each element body in the first direction and such that the internal conductor is not exposed at the cut surface.

According to one embodiment of the present disclosure, the step of cutting the first block into a plurality of second blocks includes the step of cutting the first block such that the portions serving as the element bodies are arranged in one line in the first direction in each of the plurality of second blocks, and the step of cutting each of the plurality of second blocks in a second direction includes the step of separating the portions serving as the element bodies into individual pieces.

According to one embodiment of the present disclosure, the step of cutting the first block into a plurality of second blocks includes the step of cutting the first block such that the portions serving as the element bodies are arranged in a plurality of lines in the first direction in each of the plurality of second blocks, and said step of cutting each of the plurality of second blocks in a second direction includes the step of cutting each of the plurality of second blocks in the first direction and in the second direction, and separating the portions serving as the element bodies into individual pieces.

According to the present disclosure, positional misalignment of internal conductors in each of a plurality of chips cut out from a mother block can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a side view showing the positional relation between the first conductive patterns and the third cutting line at each cut surface along the first cutting line detected by an image processing apparatus in the comparative example.

FIG. 12 is a side view showing the positional relation between the first conductive patterns and the third cutting line in a chip located in the center of the mother block in the Y direction in the comparative example.

DETAILED DESCRIPTION

Figure 1:
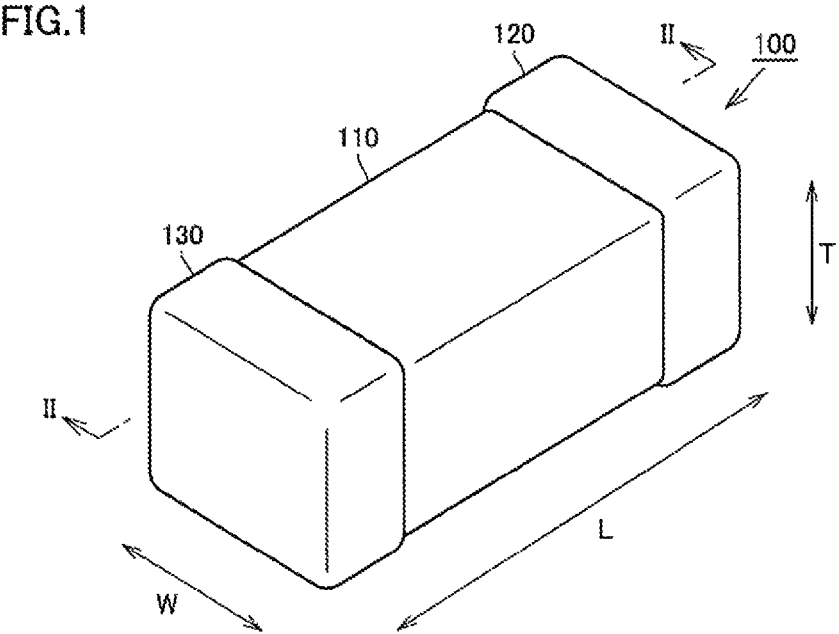
FIG. 1 is a perspective view showing an external appearance of an electronic component according to one embodiment of the present disclosure.

Hereinafter, a method of manufacturing an electronic component according to one embodiment of the present disclosure will be described with reference to the drawings. In the description of the embodiment set forth below, the same or corresponding components in the drawings are designated by the same reference characters, and a description thereof will not be repeated. Although a multilayer ceramic capacitor will be described as an electronic component, the electronic component is not limited to a capacitor, but may be a piezoelectric component, a thermistor, an inductor, or the like.

Figure 2:
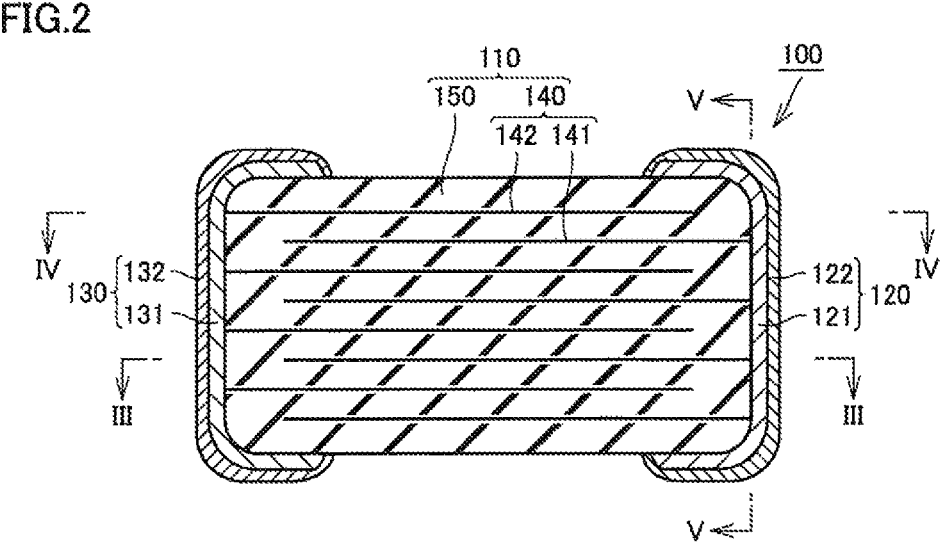
FIG. 2 is a cross-sectional view of the electronic component in FIG. 1 when viewed in the direction indicated by an arrow line II-II.
Figure 3:
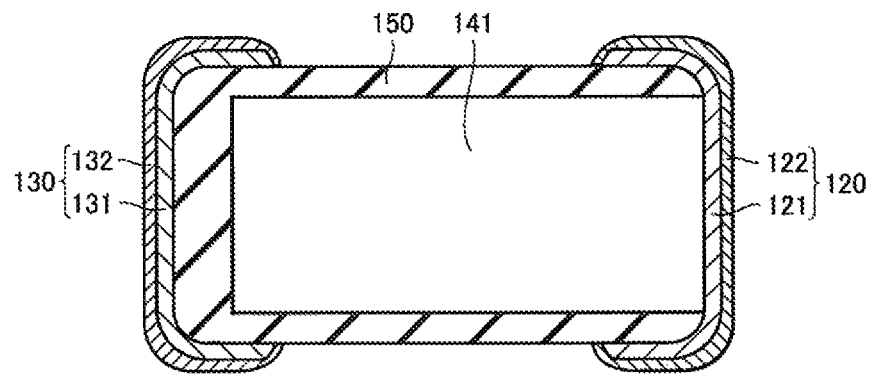
FIG. 3 is a cross-sectional view of the electronic component in FIG. 2 when viewed in the direction indicated by an arrow line III-III.
Figure 4:
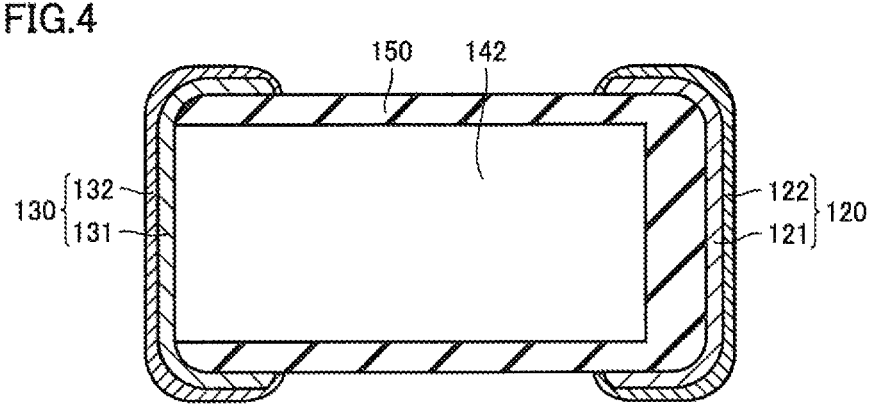
FIG. 4 is a cross-sectional view of the electronic component in FIG. 2 when viewed in the direction indicated by an arrow line IV-IV.
Figure 5:
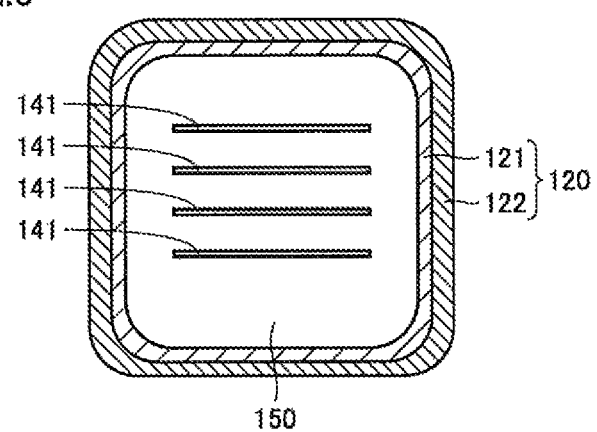
FIG. 5 is a cross-sectional view of the electronic component in FIG. 2 when viewed in the direction indicated by an arrow line V-V.

First described will be an example of the configuration of a multilayer ceramic capacitor serving as an electronic component according to one embodiment of the present disclosure. FIG. 1 is a perspective view showing an external appearance of an electronic component according to one embodiment of the present disclosure. FIG. 2 is a cross-sectional view of the electronic component in FIG. 1 when viewed in the direction indicated by an arrow line II-II. FIG. 3 is a cross-sectional view of the electronic component in FIG. 2 when viewed in the direction indicated by an arrow line III-III. FIG. 4 is a cross-sectional view of the electronic component in FIG. 2 when viewed in the direction indicated by an arrow line IV-IV. FIG. 5 is a cross-sectional view of the electronic component in FIG. 2 when viewed in the direction indicated by an arrow line V-V. In FIG. 1, the longitudinal direction of an element body set forth below is indicated by L; the width direction of the element body is indicated by W; and the thickness direction of the element body is indicated by T.

As shown in FIGS. 1 to 5, an electronic component 100 according to one embodiment of the present disclosure includes: an element body 110 having an internal conductor embedded therein; and an external electrode disposed on the surface of element body 110 and electrically connected to the internal conductor.

Element body 110 has an approximately rectangular parallelepiped outer shape. In element body 110, ceramic layers 150 each serving as a dielectric layer and internal electrodes 140 each having a flat plate shape and serving as an internal conductor are alternately stacked. In electronic component 100 according to the present embodiment, an external electrode is provided at each of both ends of element body 110.

The external electrode includes a first external electrode 120 provided at one end of element body 110 in the longitudinal direction and a second external electrode 130 provided at the other end of element body 110 in the longitudinal direction.

In element body 110 according to the present embodiment, the direction in which ceramic layers 150 and internal electrodes 140 are stacked is orthogonal to longitudinal direction L and width direction W of element body 110. In other words, the direction in which ceramic layers 150 and internal electrodes 140 are stacked is in parallel to thickness direction T of element body 110.

Element body 110 has one pair of main surfaces that are orthogonal to thickness direction T, one pair of end faces that are orthogonal to longitudinal direction L, and one pair of side surfaces that are orthogonal to width direction W. As described above, element body 110 has an approximately rectangular parallelepiped outer shape, but may have rounded corners. Furthermore, projections and depressions may be formed on any of one pair of main surfaces, one pair of end faces and one pair of side surfaces.

Each configuration will be hereinafter described in detail.

Ceramic layer 150 can be made using dielectric ceramics including, as a main ingredient, $BaTiO_3$, $CaTiO_3$, $SrTiO_3$, $CaZrO_3$, or the like. Furthermore, ceramic layer 150 can also be made using a material including any of these main ingredients to which a Mn compound, a Co compound, an Si compound, a rare earth compound or the like is added as an accessory ingredient.

In the case where the electronic component is a piezoelectric component, ceramic layer 150 can be formed of piezoelectric ceramics. Piezoelectric ceramics may, for example, be a PZT (lead zirconate titanate)-based ceramics and the like.

In the case where the electronic component is a thermistor, ceramic layer 150 can be formed of semiconductor ceramics. Semiconductor ceramics may, for example, be spinel-based ceramics and the like.

In the case where the electronic component is an inductor, ceramic layer 150 can be formed of magnetic ceramics. Magnetic ceramics may, for example, be ferrite ceramics and the like.

Internal electrode 140 includes a first internal electrode 141 formed in an approximately rectangular shape as seen in plan view and a second internal electrode 142 formed in an approximately rectangular shape as seen in plan view. First internal electrodes 141 and second internal electrodes 142 are alternately arranged at regular intervals in thickness direction T of element body 110. Furthermore, first internal electrode 141 and second internal electrode 142 are arranged so as to face each other with ceramic layer 150 interposed therebetween.

First internal electrode 141 extends from one end of element body 110 in the longitudinal direction toward the other end thereof. As shown in FIG. 3, first internal electrode 141 is connected to first external electrode 120 at one end face of element body 110.

Second internal electrode 142 extends from the other end of element body 110 in the longitudinal direction toward the one end thereof. As shown in FIG. 4, second internal electrode 142 is connected to second external electrode 130 at the other end face of element body 110.

Internal electrode 140 can be made using metal such as Ni, Cu, Ag, Pd, and Au, or an alloy containing at least one of these metals, for example, an alloy of Ag and Pd.

In the present embodiment, the external electrode includes an inside external electrode provided so as to cover both ends of element body 110 and an outside external electrode provided so as to cover this inside external electrode.

The inside external electrode may be made of any metal as long as it functions as a solder barrier layer, and can be made using metal such as Ni or Cu or using an alloy containing at least one of these metals.

The outside external electrode may be made of any metal as long as it shows excellent wettability with solder, and may be made using metal such as Sn or Au, or using an alloy containing at least one of these metals.

As shown in FIGS. 2 to 5, first external electrode 120 includes a first inside external electrode 121 and a first outside external electrode 122. First inside external electrode 121 covers one end of element body 110 in the longitudinal direction. First outside external electrode 122 covers first inside external electrode 121.

Second external electrode 130 includes a second inside external electrode 131 and a second outside external electrode 132. Second inside external electrode 131 covers the other end of element body 110 in the longitudinal direction. Second outside external electrode 132 covers second inside external electrode 131.

The method of manufacturing an electronic component according to the present embodiment will be hereinafter described.

First, ceramic paste containing ceramic powder is applied in a sheet-like shape by the die coater method, the gravure coater method, the micro-gravure coater method or the like, and then dried to produce a ceramic green sheet.

Conductive paste for forming an internal electrode is applied onto a part of a plurality of produced ceramic green sheets so as to be in a prescribed pattern by the screen printing method, the ink jet printing method, the gravure printing method, or the like.

In this way, a ceramic green sheet on which a conductive pattern serving as an internal electrode is formed and a ceramic green sheet on which a conductive pattern is not formed are prepared. It is to be noted that ceramic paste and conductive paste that is used for forming an internal electrode may include a known binder and solvent.

Figure 6:
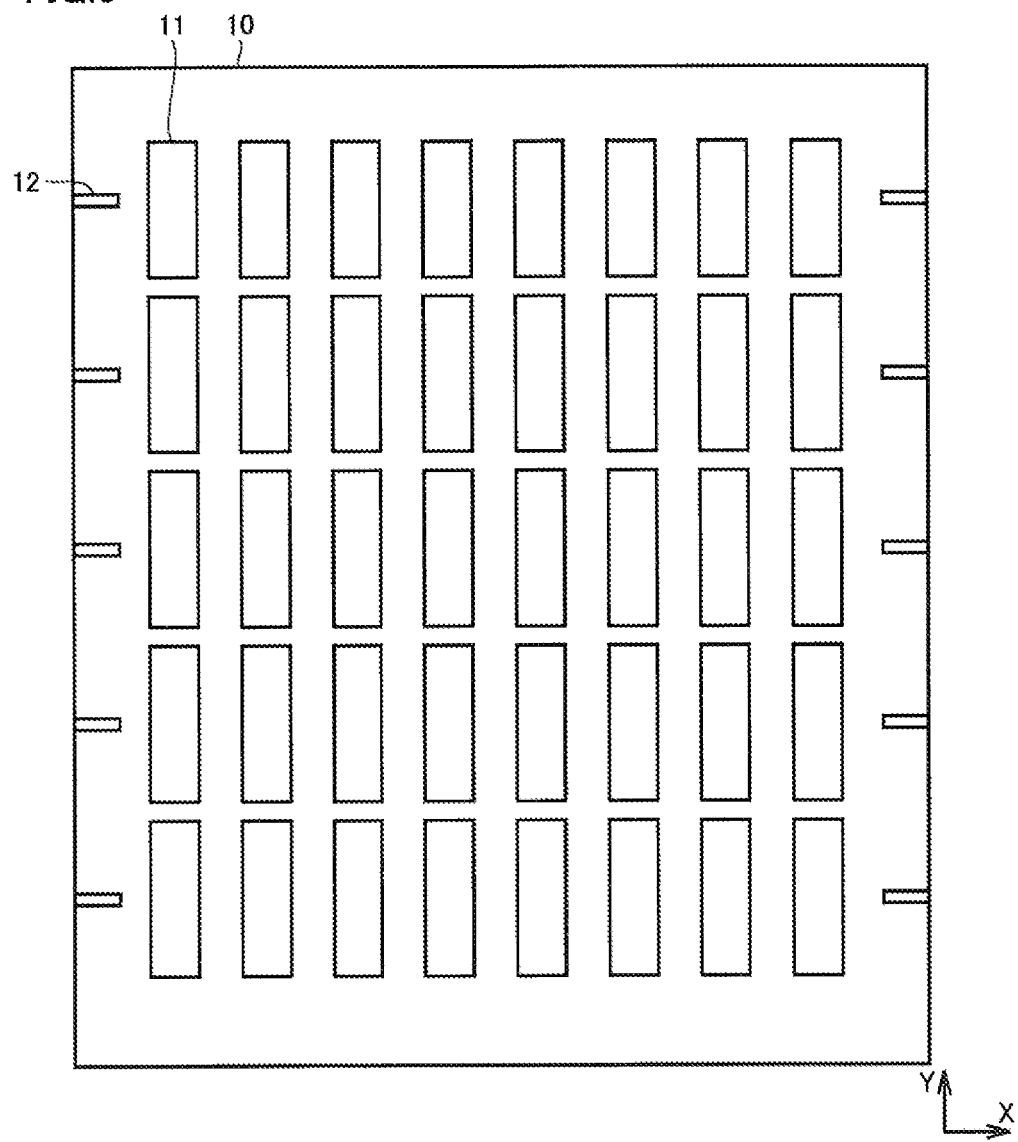
FIG. 6 is a plan view showing an external appearance of a ceramic green sheet on which conductive patterns serving as an internal electrode and a cutting mark are formed.

FIG. 6 is a plan view showing an external appearance of a ceramic green sheet on which conductive patterns serving as an internal electrode and a cutting mark are formed. As shown in FIG. 6, a first conductive pattern 11 serving as an internal electrode and a second conductive pattern 12 serving as a cutting mark are formed on ceramic green sheet 10. The cutting mark is used as a mark for block cutting.

In the present embodiment, a plurality of first conductive patterns 11 each having a rectangular shape are arranged in a matrix form in the X direction and in the Y direction that is orthogonal to the X direction. Specifically, the plurality of first conductive patterns 11 are arranged such that the longitudinal direction of each first conductive pattern 11 extends in parallel to the Y direction.

Furthermore, two second conductive patterns 12 forming a pair and each having a rectangular shape are disposed at respective ends on both sides of ceramic green sheet 10 in the X direction. In this case, a plurality of pairs of second conductive patterns 12 are arranged at intervals in the Y direction. Specifically, the plurality of second conductive patterns 12 are arranged such that the longitudinal direction of each second conductive pattern 12 extends in parallel to the X direction. Each of second conductive patterns 12 is arranged along a straight line that passes through the approximately center position in the longitudinal direction of each of first conductive patterns 11 arranged in the X direction.

A plurality of ceramic green sheets 10 each having no conductive pattern formed thereon are stacked, on which about several hundred ceramic green sheets 10 each having first conductive pattern 11 and second conductive pattern 12 formed thereon are sequentially stacked, further on which a plurality of ceramic green sheets 10 each having no conductive pattern formed thereon are stacked, thereby producing a mother block serving as the first block. In this way, a mother block formed by stacking a plurality of ceramic green sheets 10 serving as element body 110 is prepared. It is to be noted that an intermediate block formed by being cut out from the mother block may be prepared as the first block. In this case, an intermediate block serving as the first block is cut, thereby forming another intermediate block serving as the second block.

Figure 7:
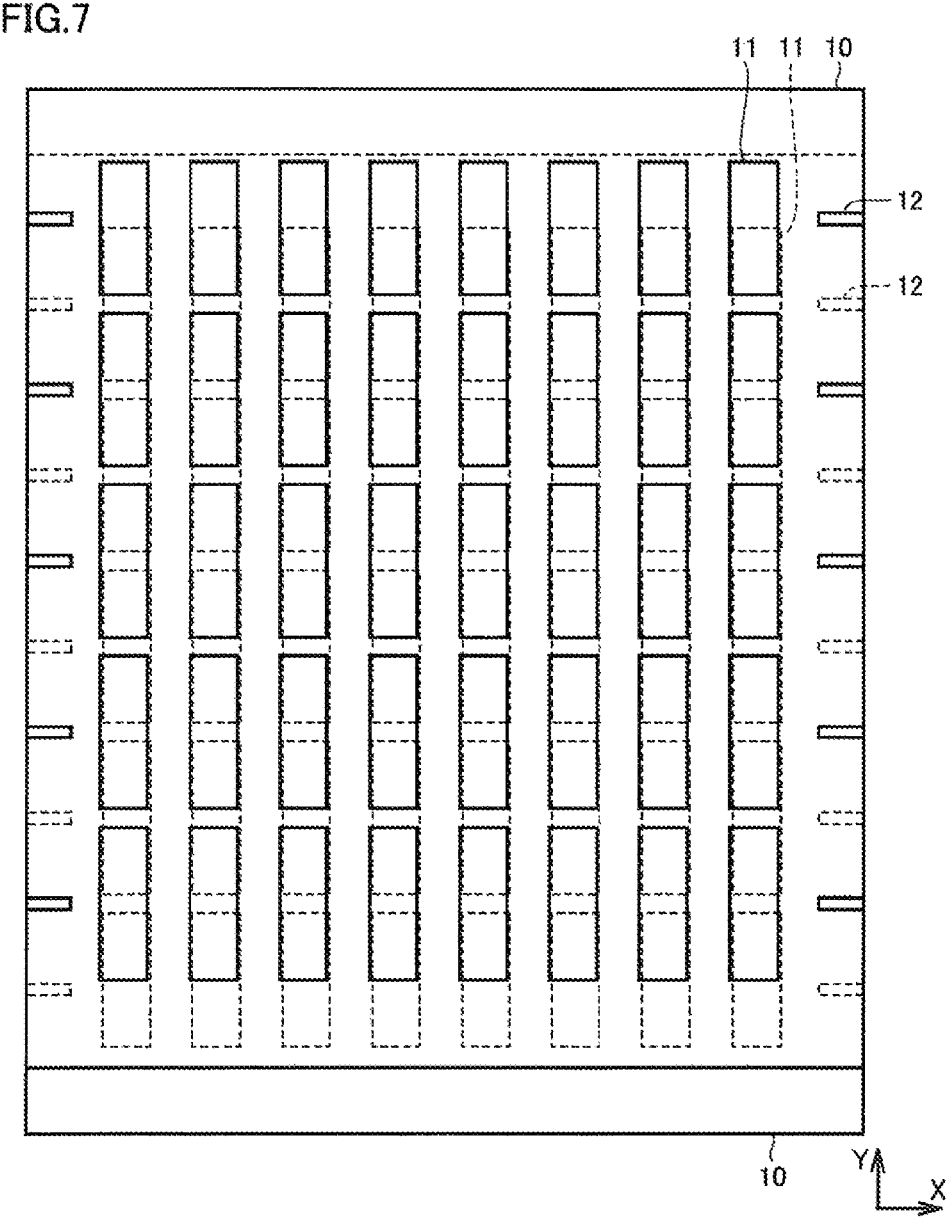
FIG. 7 is a plan view showing the state in which ceramic green sheets each having first and second conductive patterns formed thereon are stacked.

FIG. 7 is a plan view showing the state in which ceramic green sheets each having first and second conductive patterns formed thereon are stacked. As shown in FIG. 7, when a plurality of ceramic green sheets 10 each having first conductive pattern 11 and second conductive pattern 12 formed thereon are sequentially stacked, the plurality of ceramic green sheets 10 are stacked at positions displaced from one another in the Y direction such that first conductive patterns 11 located at corresponding positions in stacked ceramic green sheets 10 are overlapped with each other by an approximately half length in the longitudinal direction thereof.

Then, the mother block is subjected to thermo-compression bonding in the stacking direction by means of isostatic pressing, metal mold pressing or the like. During thermocompression bonding, the positions of first conductive patterns 11 may be displaced since ceramic green sheet 10 has fluidity.

Figure 8:
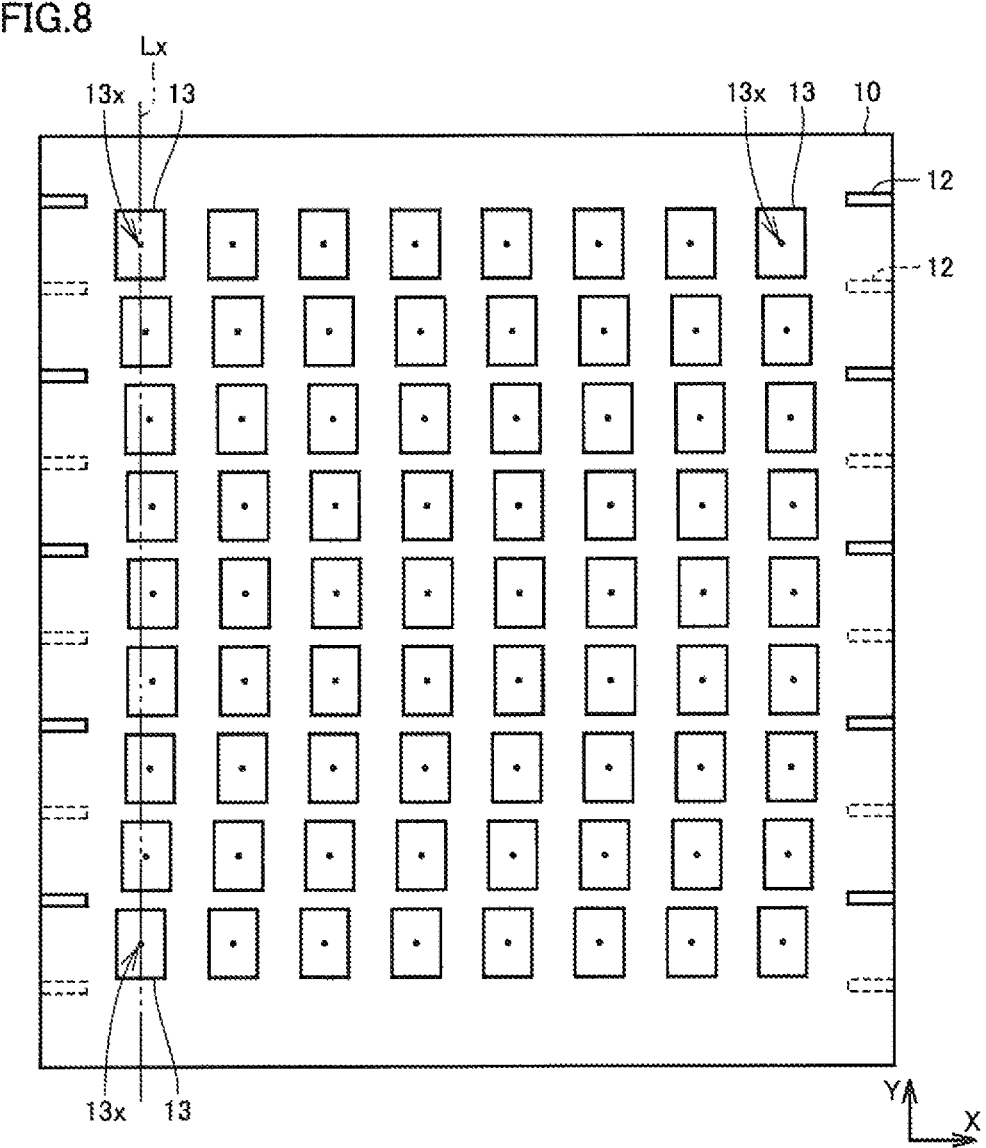
FIG. 8 is a plan view showing a mother block in which positional misalignment of first conductive patterns occurs.

FIG. 8 is a plan view showing a mother block in which positional misalignment of first conductive patterns occurs. FIGS. 8 to 10, 13, 15, and 16 set forth below each show ceramic green sheet 10 transparently and also show only a function region 13 in first conductive pattern 11. In this function region 13, first conductive patterns 11 located at corresponding positions in stacked ceramic green sheets 10 are overlapped with each other and function as a capacitor. Also, the figures each show a center point 13x in each function region 13. Each of function regions 13 is included in a corresponding one of chips that each corresponds to a portion serving as element body 110 in electronic component 100. For the sake of explanation, positional misalignment of the first conductive patterns is shown in a distinguishable manner, but each position is misaligned actually by about several μm.

As shown in FIG. 8, when positional misalignment of first conductive patterns 11 occurs, the position of function region 13 included in a chip in electronic component 100 is displaced. Positional misalignment of first conductive patterns 11 occurs in various manners. Specifically, in the present embodiment, the more the function regions 13 are close to the center of the mother block in the Y direction relative to both ends thereof, the more these function regions 13 are displaced to the one side in the X direction (to the right side in FIG. 8).

Accordingly, the more the positions of center points 13x in function regions 13 are close to the center of the mother block in the Y direction relative to both ends thereof, the more these positions of center points 13x are away from a straight line Lx connecting center points 13x in function regions 13 that are located at both ends of the mother block in the Y direction.

In the present embodiment, the mother block is cut while being affixed to a foam pressure sensitive adhesive sheet 20 described later. It is to be noted that the mother block does not necessarily have to be affixed to foam pressure sensitive adhesive sheet 20, but in this case, the mother block may be cut on a mounting stage capable of holding the mother block by adsorption.

Figure 9:
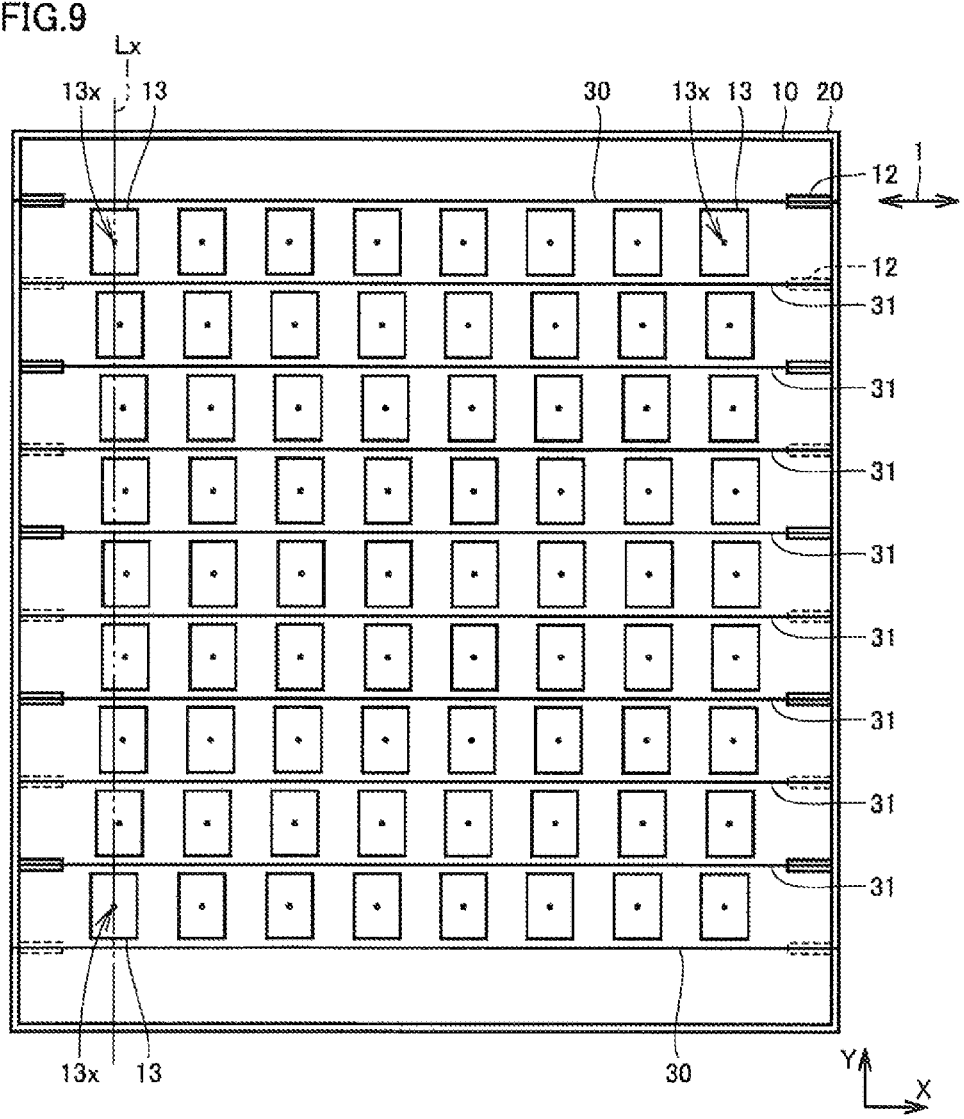
FIG. 9 is a plan view showing the state in which the mother block affixed to a pressure sensitive adhesive sheet is cut in the first direction in a comparative example.

The method of cutting a mother block according to a comparative example will be hereinafter described. FIG. 9 is a plan view showing the state in which the mother block affixed to a foam pressure sensitive adhesive sheet is cut in the first direction in a comparative example.

As shown in FIG. 9, in the method of cutting a mother block according to the comparative example, the mother block affixed to foam pressure sensitive adhesive sheet 20 is cut in the first direction indicated by an arrow 1. In this case, the mother block and foam pressure sensitive adhesive sheet 20 are cut along a first cutting line 30 that linearly connects one pair of second conductive patterns 12, each of the paired second conductive patterns 12 being located at a corresponding one of ends of the mother block in the Y direction. In other portions, only the mother block is cut along a second cutting line 31 that linearly connects one pair of second conductive patterns 12.

By cutting both ends of the mother block in the Y direction in this way, the portion of first conductive pattern 11 connected to the external electrode can be exposed at the cut surface cut along first cutting line 30. Furthermore, since foam pressure sensitive adhesive sheet 20 is not cut along second cutting line 31, the mother blocks can be integrally maintained.

Figure 10:
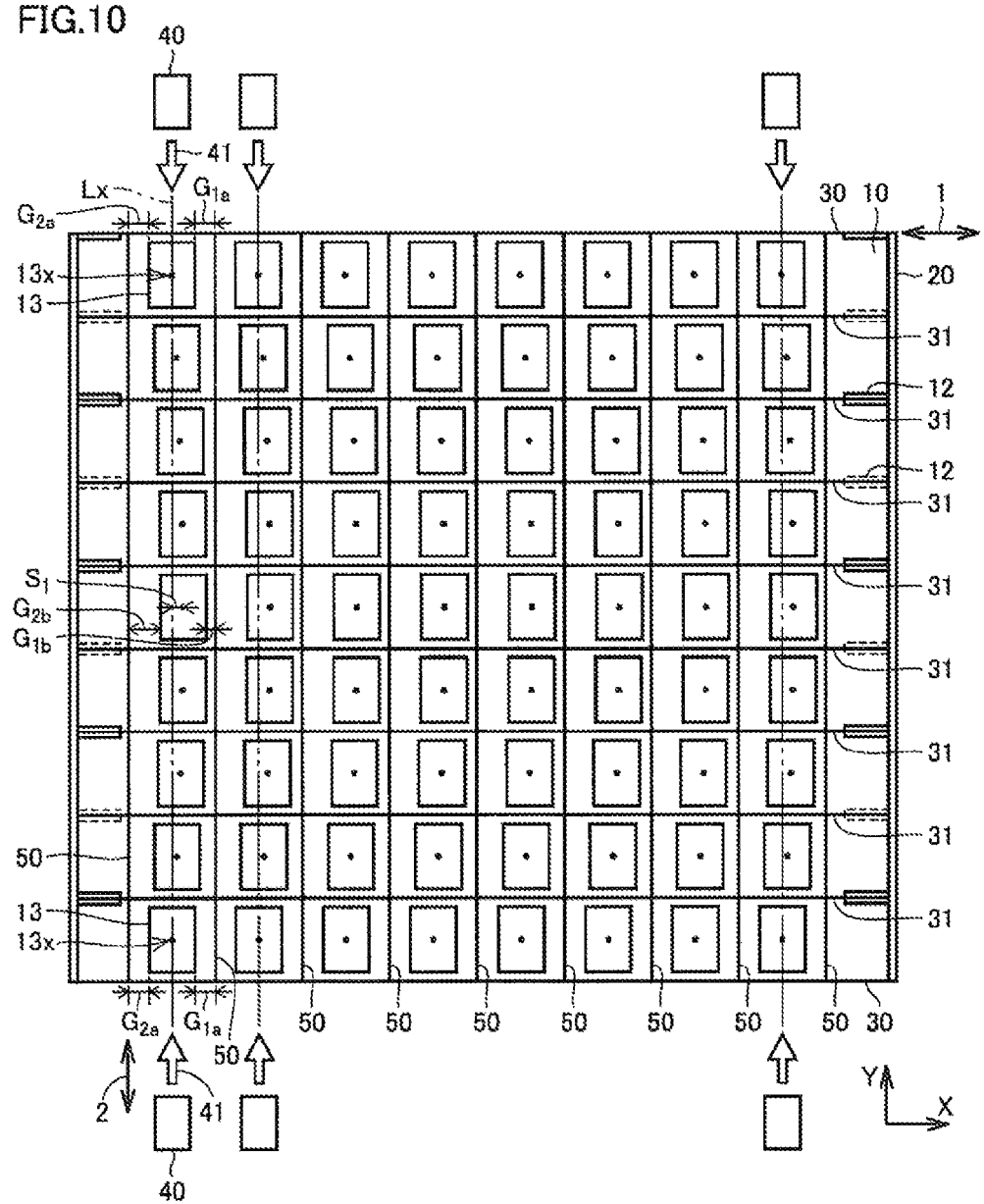
FIG. 10 is a plan view showing the state in which the mother blocks cut in the first direction are cut in the second direction in the comparative example.

FIG. 10 is a plan view showing the state in which the mother blocks cut in the first direction are cut in the second direction in the comparative example. As shown in FIG. 10, in the method of cutting a mother block according to the comparative example, the mother blocks are cut in the second direction indicated by an arrow 2 crossing the first direction such that first conductive pattern 11 exposed at the cut surface cut along first cutting line 30 is located in the center of each chip in the first direction.

Specifically, both cut surfaces cut along first cutting line 30 are first imaged by image processing apparatuses 40 as shown by arrows 41 to detect the position of first conductive pattern 11 exposed at each cut surface.

Then, based on the position of first conductive pattern 11 at each cut surface along first cutting line 30 that is detected by image processing apparatus 40, only the mother block is cut along a third cutting line 50 extending in the second direction.

FIG. 11 is a side view showing the positional relation between the first conductive patterns and the third cutting line at each cut surface along the first cutting line detected by an image processing apparatus in the comparative example.

FIG. 11 shows only one chip.

As shown in FIGS. 10 and 11, in the method of cutting a mother block according to the comparative example, the position of third cutting line 50 is determined such that a first gap $G_{1a}$ corresponding to a distance between one end of first conductive pattern 11 in the first direction and third cutting line 50 and a second gap $G_{2a}$ corresponding to a distance between the other end of first conductive pattern 11 in the first direction and third cutting line 50 are almost equal to each other at each cut surface along first cutting line 30 detected by image processing apparatus 40.

As described above, the more the positions of center points 13x in function regions 13 are close to the center of the mother block in the Y direction relative to both ends thereof, the more these positions of center points 13x are away from straight line Lx connecting center points 13x in function regions 13 located at both ends of the mother block in the Y direction. Accordingly, center point 13x defined in function region 13 located in the center of the mother block in the Y direction is located at a distance $S_1$ from straight line Lx. As a result, in a chip located in the center of the mother block in the Y direction, first conductive pattern 11 is located in a displaced position.

FIG. 12 is a side view showing the positional relation between the first conductive patterns and the third cutting line in a chip located in the center of the mother block in the Y direction in the comparative example. As shown in FIG. 12, in the chip located in the center of the mother block in the Y direction, a first gap $G_{1b}$ corresponding to a distance between one end of first conductive pattern 11 in the first direction and third cutting line 50 is relatively smaller than a second gap $G_{2b}$ corresponding to a distance between the other end of first conductive pattern 11 in the first direction and third cutting line 50.

In this way, when first conductive pattern 11 serving as an internal electrode is located in a displaced position in a chip, the water resistance of electronic component 100 is decreased. When infiltration of moisture into a multilayer ceramic capacitor occurs, electrical insulation properties are decreased to deteriorate the quality. Accordingly, each of all chips is required to have such a configuration that first conductive pattern 11 serving as an internal electrode is located in the center in the first direction.

Figure 13:
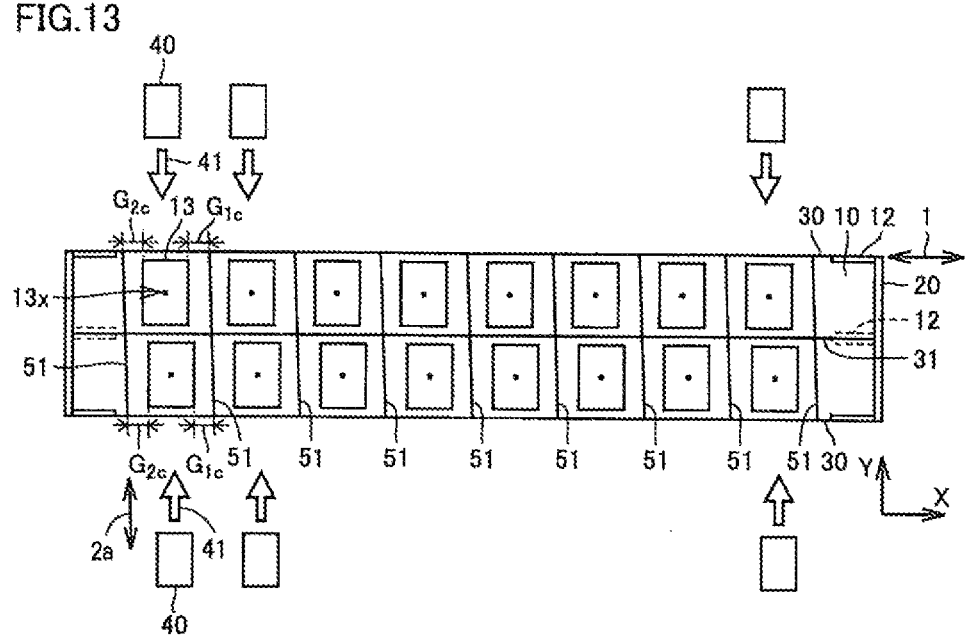
FIG. 13 is a plan view showing the state in which intermediate blocks divided by cutting the mother block in the first direction are cut in the second direction, in one embodiment of the present disclosure.

Thus, in the method of manufacturing an electronic component according to the present embodiment, the mother block is cut as in the following manner. FIG. 13 is a plan view showing the state in which intermediate blocks serving as the second blocks divided by cutting the mother block in the first direction are cut in the second direction, in the present embodiment.

As shown in FIG. 13, in the present embodiment, the mother block is cut such that chips are arranged in two lines in the first direction in the intermediate block. In other words, first cutting line 30 is defined on both sides of second cutting line 31 in the Y direction of the intermediate block. As described above, the mother block and foam pressure sensitive adhesive sheet 20 are cut along first cutting line 30, and only the mother block is cut along second cutting line 31.

By cutting the mother block into a plurality of intermediate blocks in this way, a portion of first conductive pattern 11 connected to the external electrode can be exposed at the cut surface cut along first cutting line 30. Furthermore, since foam pressure sensitive adhesive sheet 20 is not cut along second cutting line 31, the intermediate blocks can be integrally maintained.

When the mother block is cut in the first direction, a pair of second conductive patterns 12 exposed at both end faces of the mother block in the X direction are imaged by image processing apparatuses (not shown) and then detected. First cutting line 30 is then defined so as to connect the pair of detected second conductive patterns 12.

When second conductive pattern 12 is not exposed at the end face of the mother block, the end of the mother block in the X direction may be cut to expose second conductive pattern 12. Furthermore, second conductive pattern 12 does not have to be provided, but in this case, the end of the mother block in the X direction may be cut to expose first conductive pattern 11, and a portion of first conductive pattern 11 other than function region 13 may be cut. Examples of the method of cutting a mother block may be a press-cutting method, a cutting method using dicing, or the like.

After dividing the mother block into a plurality of intermediate blocks in this way, the intermediate blocks are picked up one by one. Each of the picked up intermediate blocks is cut in the second direction indicated by an arrow 2a crossing the first direction such that first conductive pattern 11 exposed at the cut surface cut along first cutting line 30 is located in the center of each chip in the first direction.

Specifically, both of the cut surfaces cut along first cutting line 30 are first imaged by image processing apparatuses 40 as indicated by arrows 41 to detect the position of first conductive pattern 11 exposed at each cut surface.

Then, based on the position of first conductive pattern 11 exposed at each cut surface along first cutting line 30 and detected by image processing apparatus 40, only the intermediate block is cut along third cutting line 51 that extends in the second direction. Thereby, the chips can be separated into individual pieces.

Figure 14:
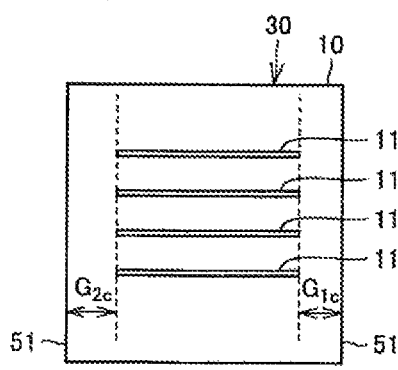
FIG. 14 is a side view showing the positional relation between the conductive patterns and the third cutting line at each cut surface along the first cutting line detected by the image processing apparatus, in one embodiment of the present disclosure.

FIG. 14 is a side view showing the positional relation between the conductive patterns and the third cutting line at each cut surface along the first cutting line detected by the image processing apparatus, in one embodiment of the present disclosure. FIG. 14 shows only one chip.

As shown in FIGS. 13 and 14, in the method of cutting a mother block according to the present embodiment, the position of third cutting line 51 is determined such that a first gap $G_{1c}$ corresponding to a distance between one end of first conductive pattern 11 in the first direction and third cutting line 51 and a second gap $G_{2c}$ corresponding to a distance between the other end of first conductive pattern 11 in the first direction and third cutting line 51 are almost equal to each other at each cut surface along first cutting line 30 detected by image processing apparatus 40. As a result, third cutting line 51 obliquely crosses first cutting line 30.

In order to cut the intermediate block along third cutting line 51 inclined in this way, a mounting stage having the intermediate block placed thereon is provided so as to be rotatable in the in-plane direction of the mounting surface. In other words, when the mounting stage rotates corresponding to the inclination angle of third cutting line 51 in the state in which the intermediate block is placed in the center of rotation of the mounting stage, the orientation of the intermediate block relative to the cutting blade is inclined.

In the present embodiment, the intermediate block is configured such that chips are arranged in two lines in the first direction. Accordingly, in each of all chips, first conductive patterns 11 serving as an internal electrode can be located so as to be close to the center in the first direction.

It is to be noted that second cutting line 31 is defined when the mother block is cut into a plurality of intermediate blocks in the present embodiment, but this second cutting line 31 does not have to be defined. In this case, each of the plurality of intermediate blocks is cut in the first direction and in the second direction to separate the chips into individual pieces. When each of the plurality of intermediate blocks is cut in the first direction and in the second direction, cutting may be started from either direction of the first direction and the second direction.

Figure 15:
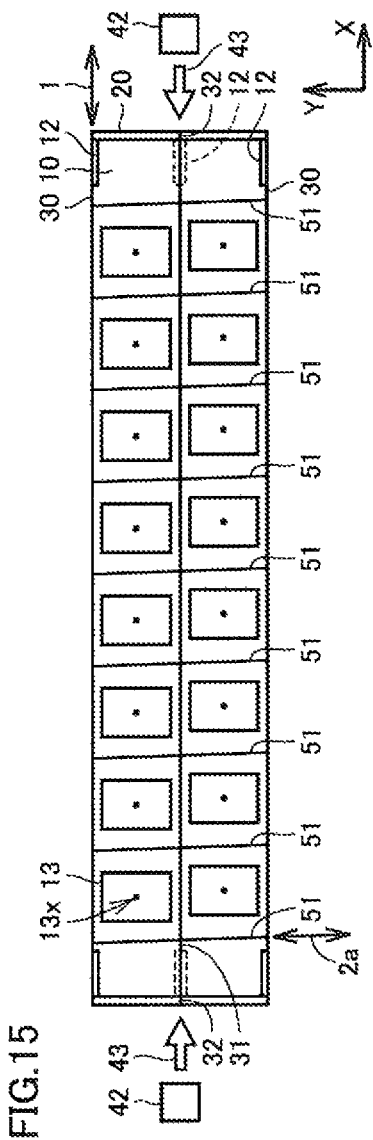
FIG. 15 is a plan view showing the state in which intermediate blocks cut in the second direction are cut in the first direction to separate chips into individual pieces.

FIG. 15 is a plan view showing the state in which intermediate blocks cut in the second direction are cut in the first direction to separate chips into individual pieces. As shown in FIG. 15, when each of the intermediate blocks is cut in the first direction, paired second conductive patterns 12 each exposed at a corresponding one of both end faces of the intermediate block in the X direction are imaged by image processing apparatuses 42 as shown by arrows 43 and then detected. A first cutting line 32 is defined so as to connect the pair of detected second conductive patterns 12, and the intermediate block and foam pressure sensitive adhesive sheet 20 are cut along this first cutting line 32, thereby separating the chips into individual pieces.

Furthermore, the mother block may be cut such that chips are arranged in one line in the first direction in the intermediate block. Hereinafter described will be a method of manufacturing an electronic component according to a modification of the present embodiment in which a mother block is cut in this way.

Figure 16:
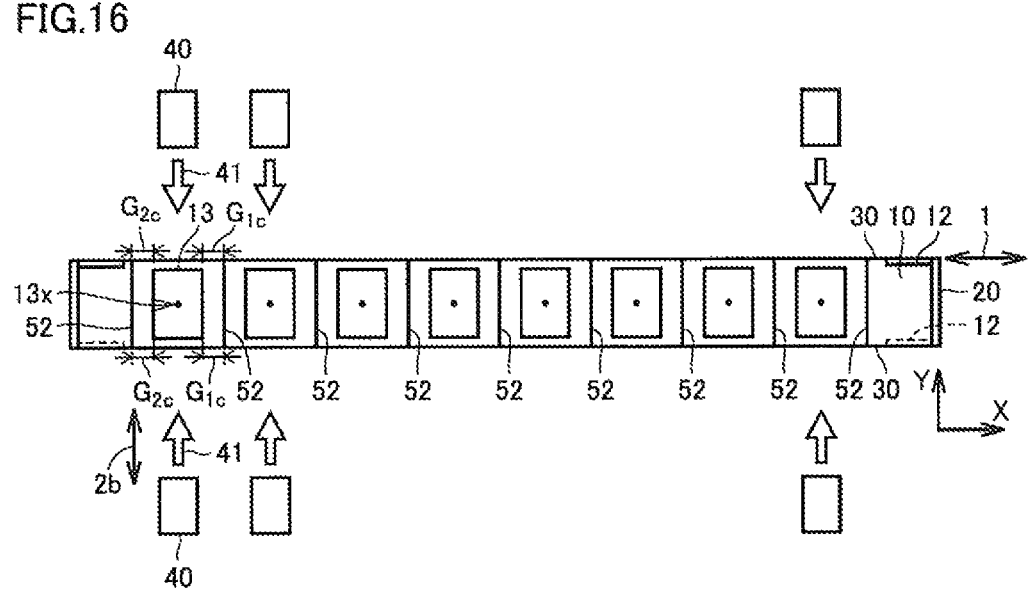
FIG. 16 is a plan view showing the state in which an intermediate block obtained by cutting and dividing the mother block in the first direction is cut in the second direction, in a modification of one embodiment of the present disclosure.

FIG. 16 is a plan view showing the state in which an intermediate block obtained by cutting and dividing the mother block in the first direction is cut in the second direction, in a modification of one embodiment of the present disclosure.

As shown in FIG. 16, in the modification of one embodiment of the present disclosure, the mother block is cut such that chips are arranged in one line in the first direction in the intermediate block. In other words, first cutting lines 30 are defined so as to be lined in the Y direction of the mother block.

By cutting the mother block into a plurality of intermediate blocks in this way, the portion of first conductive pattern 11 connected to the external electrode can be exposed at the cut surface cut along first cutting line 30.

After dividing the mother block into a plurality of intermediate blocks, these intermediate blocks are picked up one by one. Each of the picked up intermediate blocks is cut in the second direction indicated by an arrow 2b crossing the first direction such that first conductive pattern 11 exposed at the cut surface cut along first cutting line 30 is located in the center of each chip in the first direction.

Specifically, both of the cut surfaces cut along first cutting line 30 are imaged by image processing apparatuses 40 as indicated by arrows 41 to detect the position of first conductive pattern 11 exposed at each cut surface.

Then, based on the position of first conductive pattern 11 exposed at each cut surface along first cutting line 30 and detected by image processing apparatus 40, only the intermediate block is cut along third cutting line 52 extending in the second direction. Thereby, the chips can be separated into individual pieces.

Figure 17:
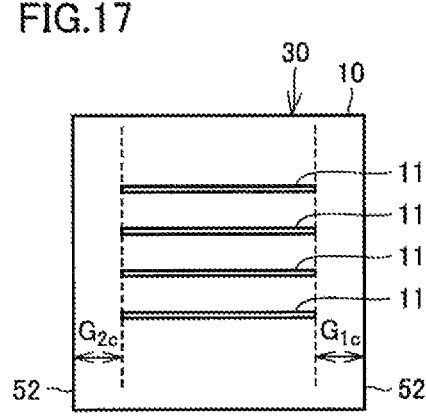
FIG. 17 is a side view showing the positional relation between the conductive patterns and the third cutting line at each cut surface along the first cutting line detected by the image processing apparatus, in the modification of one embodiment of the present disclosure.

FIG. 17 is a side view showing the positional relation between the conductive patterns and the third cutting line at each cut surface along the first cutting line detected by the image processing apparatus, in the modification of one embodiment of the present disclosure. FIG. 17 shows only one chip.

As shown in FIGS. 16 and 17, in the method of cutting a mother block according to the modification of one embodiment of the present disclosure, the position of third cutting line 52 is determined such that first gap $G_{1c}$ corresponding to a distance between one end of first conductive pattern 11 in the first direction and third cutting line 52 and second gap $G_{2c}$ corresponding to a distance between the other end of first conductive pattern 11 in the first direction and third cutting line 52 are almost equal to each other at each cut surface along first cutting line 30 detected by image processing apparatus 40. As a result, third cutting line 52 obliquely crosses first cutting line 30.

In order to cut the intermediate block along third cutting line 52 inclined in this way, the mounting stage having the intermediate block placed thereon is provided so as to be rotatable in the in-plane direction of the mounting surface. In other words, when the mounting stage rotates corresponding to the inclination angle of third cutting line 52 in the state in which the intermediate block is placed in the center of rotation of the mounting stage, the orientation of the intermediate block relative to the cutting blade is inclined.

In the modification of the present embodiment, the intermediate block is configured such that chips are arranged in one line in the first direction. Accordingly, in each of all chips, first conductive pattern 11 serving as an internal electrode can be located so as to be further closer to the center in the first direction as compared with the present embodiment.

Figure 18:
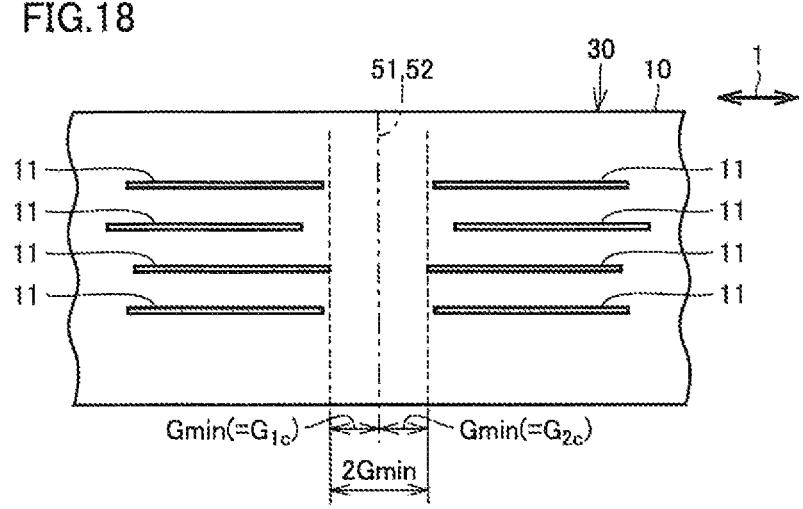
FIG. 18 is a cross-sectional view showing the state in which positional misalignment between the conductive patterns arranged in the stacking direction occurs at the cut surface along the first cutting line.

It is to be noted that positional misalignment between first conductive patterns 11 arranged in the stacking direction occurs at each cut surface of first cutting line 30. FIG. 18 is a cross-sectional view showing the state in which positional misalignment between the conductive patterns arranged in the stacking direction occurs at the cut surface along the first cutting line. FIG. 18 shows only a portion corresponding to two chips.

As shown in FIG. 18, in the case where positional misalignment between first conductive patterns 11 arranged in the stacking direction occurs at each cut surface along first cutting line 30, the positions of third cutting lines 51, 52 are determined so as to extend along the middle position between a pair of first conductive patterns 11 located closest to each other among pairs of first conductive patterns 11 that are located adjacent to each other in the first direction.

In this case, the intermediate block is cut along third cutting lines 51, 52 that extend along the position in the middle of a distance 2Gmin between the pair of first conductive patterns 11 located closest to each other among pairs of first conductive patterns 11 that are located adjacent to each other in the first direction. Thus, in the chip located on the left side in FIG. 18, first gap $G_{1c}$ corresponding to a distance between one end of first conductive pattern 11 in the first direction and third cutting lines 51, 52 is defined as a distance Gmin. Also, in the chip located on the right side in FIG. 18, second gap $G_{2c}$ corresponding to a distance between the other end of first conductive pattern 11 in the first direction and third cutting lines 51, 52 is defined as a distance Gmin.

Figure 19:
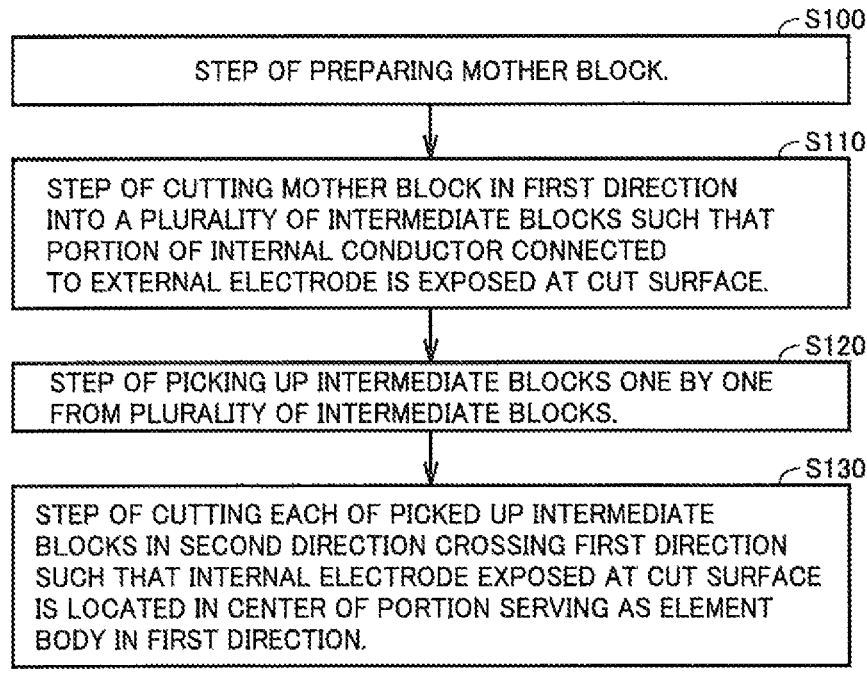
FIG. 19 is a flowchart illustrating the configuration of a method of manufacturing an electronic component according to one embodiment and a modification of the present disclosure.

FIG. 19 is a flowchart illustrating the configuration of a method of manufacturing an electronic component according to one embodiment and a modification of the present disclosure. As shown in FIG. 19, the method of manufacturing an electronic component according to the present embodiment and the modification includes: the step (S100) of preparing a mother block formed by stacking a plurality of ceramic green sheets 10 serving as element body 110; the step (S110) of cutting the mother block in the first direction into a plurality of intermediate blocks such that a portion of the internal electrode connected to the external electrode is exposed at a cut surface; the step (S120) of picking up the plurality of intermediate blocks one by one; and the step (S130) of cutting each of the picked up intermediate blocks in a second direction crossing the first direction such that the internal electrode exposed at the cut surface is located in the center of a portion serving as an element body in the first direction.

By separating the chips into individual pieces in the above-described steps, first gap $G_{1c}$ and second gap $G_{2c}$ can be approximately uniformly ensured. As a result, a decrease in the water resistance of electronic component 100 can be suppressed. Therefore, it becomes possible to suppress deterioration of the product quality caused by a decrease in electrical insulation properties resulting from infiltration of moisture into a multilayer ceramic capacitor.

In addition, chips separated into individual pieces as described above are heated to cause foam pressure sensitive adhesive sheet 20 to foam, thereby decreasing adhesiveness. Consequently, foam pressure sensitive adhesive sheet 20 can be readily peeled from each chip.

Then, each chip from which foam pressure sensitive adhesive sheet 20 is peeled is barrel-polished to cause the corners of each chip to be rounded off. It is to be noted that barrel polishing does not necessarily have to be carried out. Then, chips are baked and then hardened to thereby produce element body 110. A baking temperature is appropriately set in accordance with the types of the ceramic material and the conductive material, and for example, set within a range of 900° C. or higher and 1300° C. or lower.

Then, conductive paste containing Ni as a main ingredient is applied to both ends of element body 110 in the longitudinal direction and heated, for example, at a temperature of about 700° C., thereby baking the conductive paste onto element body 110 to form an inside external electrode. It is to be noted that conductive paste may be applied to each chip and then baked to thereby simultaneously form element body 110 and the inside external electrode.

Then, an outside external electrode made of Sn is formed on the inside external electrode by electroplating. Specifically, the outside external electrode is provided by the barrel plating method. The outside external electrode is provided on the inside external electrode by energizing a barrel that houses a plurality of element bodies 110 each having the inside external electrode formed thereon while this barrel, which is immersed in a plating solution in a plating bath, is being rotated.

Electronic component 100 can be produced by the steps as described above. According to the method of manufacturing an electronic component in accordance with the present embodiment and the modification, positional misalignment of internal conductors can be suppressed in each of a plurality of chips cut out from the mother block.

Hereinafter described will be experimental examples of comparisons carried out for distortion amounts of blocks and gap amounts of chips in the method of manufacturing an electronic component according to each of the comparative example and the present embodiment.

EXPERIMENTAL EXAMPLE

The distortion amount of the block was measured at 25 parts in each of a mother block, an intermediate block produced by dividing the mother block into two parts, and an intermediate block produced by dividing the mother block into three parts.

Figure 20:
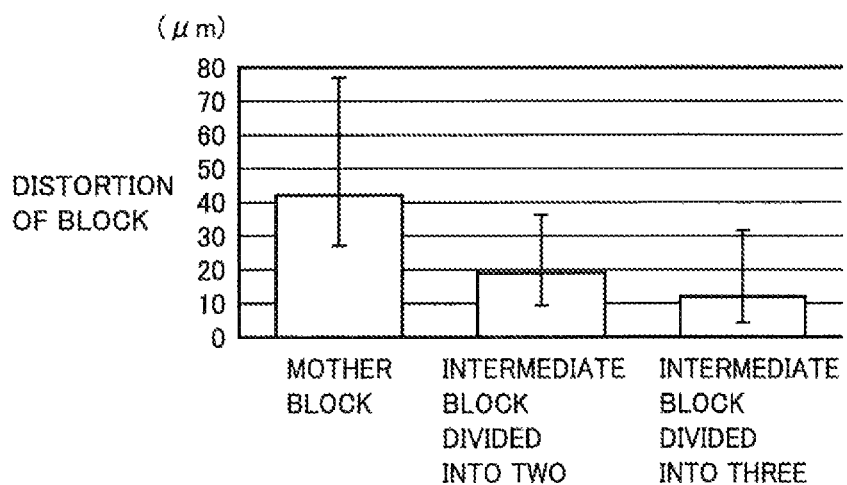
FIG. 20 is a graph showing a comparison of distortion amounts of blocks.

FIG. 20 is a graph showing a comparison of distortion amounts of the blocks. In FIG. 20, the vertical axis shows the distortion amount of each block while the horizontal axis shows the type of each block. Also in FIG. 20, the range of each measurement result is shown by an error bar while the average value of each measurement result is shown by a bar graph.

It is to be noted that the distortion amount of the block shows a value corresponding to distance $S_1$ in FIG. 10. In other words, the distortion amount of the block shows a value that is obtained by measuring the distance between straight line Lx that connects center points $13x$ in function regions 13 located at both ends of each block in the Y direction and center point $13x$ in function region 13 located in the center of each block in the Y direction.

As shown in FIG. 20, while the average value of the distortion amounts of the mother block was 42 μm, the average value of the distortion amounts of the intermediate block produced by dividing the similarly produced mother block into two parts was 19 μm, and the average value of the distortion amounts of the intermediate block produced by dividing the similarly produced mother block into three parts was 12 μm. It was confirmed from these results that the greater the number of dividing the mother block is, the more the distortion amount of the intermediate block is decreased.

The gap amount of the chip was measured in 25 chips cut out from each of a mother block, an intermediate block produced by dividing the mother block into two parts, and an intermediate block produced by dividing the mother block such that chips were arranged in one line in the first direction.

In the mother block and the intermediate block produced by dividing the mother block into two parts, first gap $G_{1b}$ and second gap $G_{2b}$ in FIG. 12 each were measured in 25 chips each located in the center in the Y direction. In the intermediate block produced by dividing the mother block such that chips were arranged in one line in the first direction, first gap $G_{1c}$ and second gap $G_{2c}$ in FIG. 17 each were measured in 25 chips.

Figure 21:
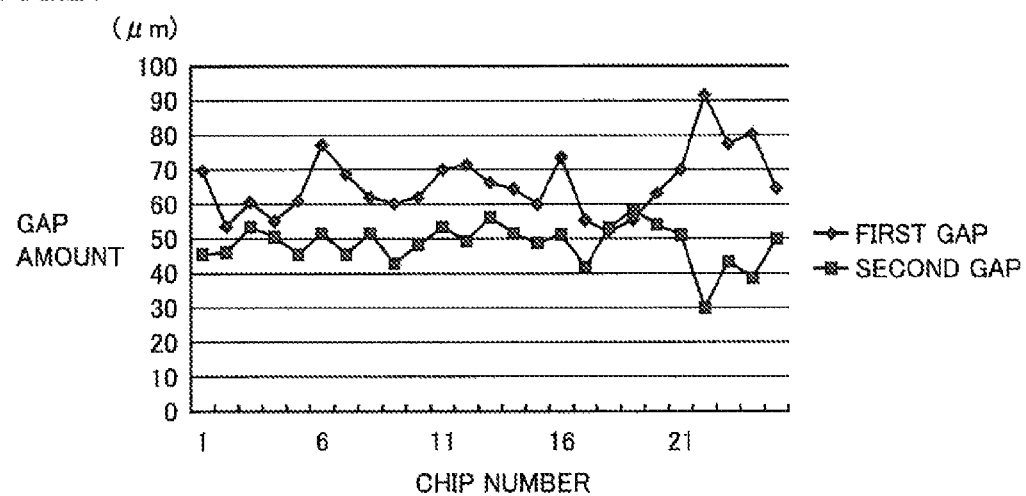
FIG. 21 is a graph showing measurement values of the first gap and the second gap in a chip located in the center of the mother block in the Y direction.
Figure 22:
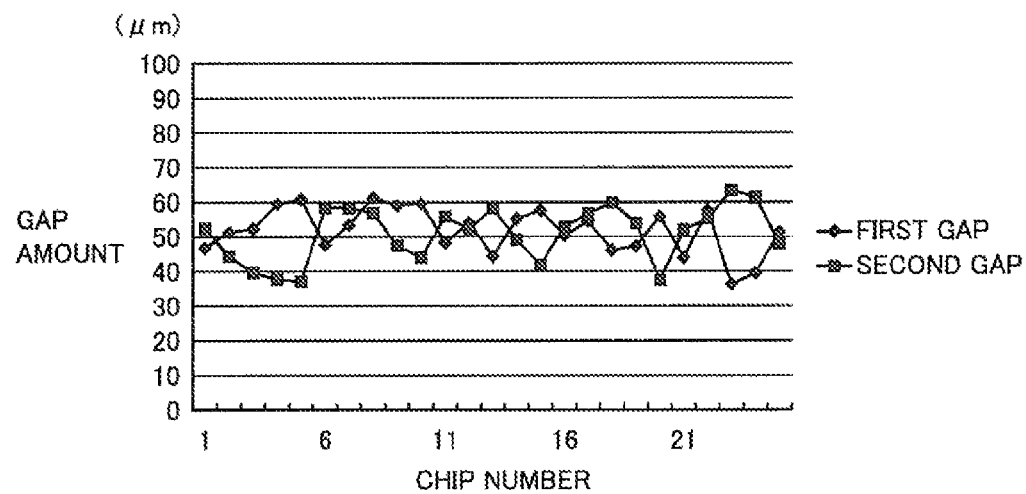
FIG. 22 is a graph showing measurement values of the first gap and the second gap in a chip located in the center of the intermediate block in the Y direction that is produced by cutting the mother block into two.
Figure 23:
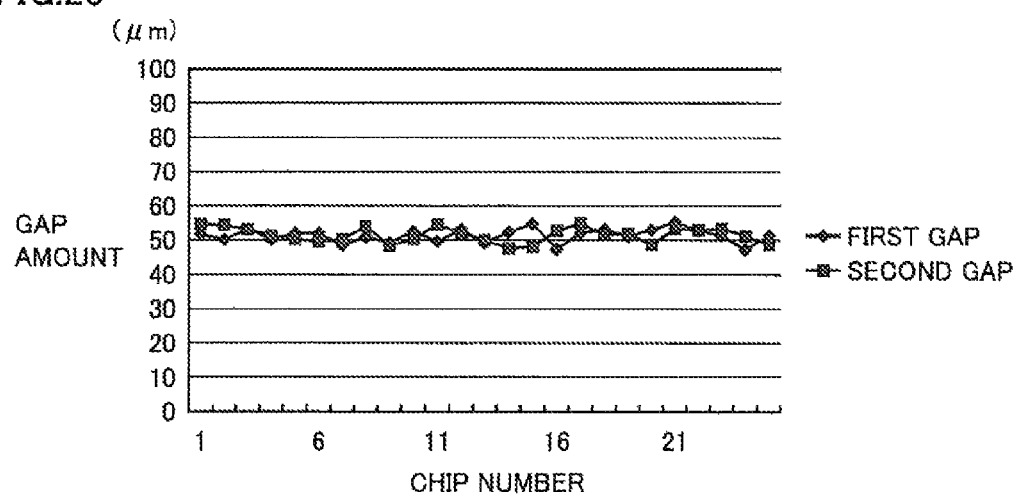
FIG. 23 is a graph showing measurement values of the first gap and the second gap in a chip of the intermediate block produced by dividing the mother block such that chips are arranged in one line in the first direction.

FIG. 21 is a graph showing measurement values of the first gap and the second gap in a chip located in the center of the mother block in the Y direction. FIG. 22 is a graph showing measurement values of the first gap and the second gap in a chip located in the center of the intermediate block in the Y direction that is produced by cutting the mother block into two. FIG. 23 is a graph showing measurement values of the first gap and the second gap in a chip of the intermediate block produced by dividing the mother block such that chips are arranged in one line in the first direction. In FIGS. 21 to 23, the vertical axis shows the gap amount while the horizontal axis shows the chip number.

As shown in FIGS. 21 to 23, it was confirmed that the more the number of dividing the mother block was, the more stably the gap amount of each chip could be ensured. In particular, in the chip cut out from the intermediate block produced by dividing the mother block such that chips were arranged in one line in the first direction, first gap $G_{1c}$ and second gap $G_{2c}$ in each chip were almost the same with stability.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A method of manufacturing an electronic component including an element body in which an internal conductor is embedded and an external electrode disposed on a surface of said element body and electrically connected to said internal conductor, said method comprising the steps of:
    preparing a first block formed by stacking a plurality of green sheets serving as said element body;
    cutting said first block in a first direction into a plurality of second blocks such that a portion of said internal conductor connected to said external electrode is exposed at a cut surface along said first direction; and
    cutting each of said plurality of second blocks in a second direction crossing said first direction such that said internal conductor exposed at each of said cut surfaces along said first direction is located in a center part of a portion serving as each said element body in said first direction and such that said internal conductor is not exposed at the cut surface along said second direction.

2. The method of manufacturing an electronic component according to claim 1, wherein
    said step of cutting said first block into the plurality of second blocks includes the step of cutting said first block such that the portions serving as said element bodies are arranged in one line in said first direction in each of said plurality of second blocks, and
    said step of cutting each of said plurality of second blocks in the second direction includes the step of separating the portions serving as the element bodies into individual pieces.

3. The method of manufacturing an electronic component according to claim 1, wherein said step of cutting said first block into the plurality of second blocks includes the step of cutting said first block such that the portions serving as said element bodies are arranged in a plurality of lines in said first direction in each of said plurality of second blocks, and
    said step of cutting each of said plurality of second blocks in the second direction includes the step of cutting each of said plurality of second blocks in said first direction and in said second direction, and separating the portions serving as said element bodies into individual pieces.

* * * * *